United States Patent [19]

Yauchi et al.

[11] Patent Number: 4,474,651
[45] Date of Patent: Oct. 2, 1984

[54] OIL WELL CASING AND TUBING JOINT AND PRODUCTION OF SAME

[75] Inventors: Akihiro Yauchi, Nishinomiya; Minoru Nishihara, Kyoto; Kunihiro Fukui, Kawanishi; Hisakazu Kawashima, Kobe; Yoshiyasu Morita, Nara, all of Japan

[73] Assignee: Sumitomo Metal Industries, Ltd., Osaka, Japan

[21] Appl. No.: 408,039

[22] Filed: Aug. 13, 1982

[30] Foreign Application Priority Data

Aug. 20, 1981 [JP] Japan ................................ 56-129321

[51] Int. Cl.³ ........................... C23B 5/56; C25D 7/04
[52] U.S. Cl. ....................................... 204/34; 204/41; 204/42
[58] Field of Search ...................... 204/38 A, 38 R, 29, 204/41, 42

[56] References Cited

U.S. PATENT DOCUMENTS

| | | | |
|---|---|---|---|
| 1,954,473 | 4/1934 | Dunn | 204/34 |
| 2,528,717 | 11/1950 | Batcheller | 204/29 |
| 2,780,019 | 2/1957 | Sullivan | 42/76 |
| 2,898,490 | 8/1959 | Damon | 313/65 |
| 2,965,551 | 12/1960 | Richaud | 204/32 |
| 3,338,803 | 8/1967 | DiBari | 204/34 |
| 3,669,851 | 6/1972 | Garvey | 204/25 |
| 4,039,399 | 8/1977 | Wallace et al. | 204/25 |

Primary Examiner—Brian E. Hearn
Assistant Examiner—Nathan Thane
Attorney, Agent, or Firm—Burns, Doane, Swecker and Mathis

[57] ABSTRACT

A joint for used in connecting oil well casing and/or tubing and method of producing same are disclosed. The joint with improved metal-to-metal sealing properties as well as improved resistance to galling is made of an alloy steel containing 10% or more by weight of Cr and comprises a metal sealing portion and a threaded portion provided with an activating layer of a metal or an alloy selected iron, nickel, zinc, cobalt, copper, manganese, chromium and alloys thereof, and an electrodeposited layer of a metal or an alloy selected from iron, copper, zinc, chromium, nickel, and alloys thereof.

22 Claims, 3 Drawing Figures

OIL WELL CASING AND TUBING JOINT AND PRODUCTION OF SAME

This invention relates to a chromium-containing steel joint for use in connecting oil well casing and tubing and to the production thereof. More particularly, this invention relates to a joint and production of same which exhibits improved resistance to galling, the joint comprising a metal sealing portion and a threaded portion, and an activating layer and an electrodeposited layer placed thereon being provided on at least part of the surface of the metal sealing portion.

Recently oil well casing and tubing have been used under severe conditions including a pressure as high as 3.5–14.0 kg/mm² (5,000–20,000 psi), and a joint for use in connecting oil well casing and tubing to be used under such severe conditions requires superior sealing properties.

In general, a joint for use in connecting oil well casing and/or tubing (hereinafter referred to merely as "oil well casing and tubing joint" or "oil well joint") is comprised of a threaded portion and a metal sealing portion. In order to provide a satisfactory level of metal-to-metal sealing with such joints, it is necessary to apply a high degree of pressure to the face-to-face contacting area at the threaded and metal sealing portions. Therefore, since in use the tubes are connected and disconnected many times by twisting and untwisting, the occurrence of "galling" is unavoidable at these portions.

The conventional oil well casing and tubing are made of plain steels and Cr-Mo steels containing several weight % of Cr and Mo. However, recently, the conditions under which oil fields are being exploited have become more severe, and oil well casing and tubing must have improved resistance to corrosion even in an $H_2S$- and $CO_2$- containing corrosive environment, and it has been proposed to manufacture oil well casing and tubing from a high-Cr steel which contains 10% or more by weight of Cr.

It is already known in the art that the before-mentioned "galling" may be prevented by surface treatment such as phosphate coating and/or sandblast processing of the steel surface of the metal sealing portion of the oil well joint. Such surface treatment moderates the metal-to-metal contact. Thus, the joint of the prior art oil well tubing and/or casing made of conventional material usually has a zinc phosphate or manganese phosphate coating.

The oil well joint is made from the same kind of material as used for the oil well casing and tubing. Therefore, if, in accordance with the recent trend, the oil well casing or tubing is made from, for example, a high-Cr steel, the oil well joint is also made from such a high-Cr alloy steel.

However, a high alloy steel such as high-Cr alloy steel is chemically less active, since the surface thereof is covered with a tenacious passive film, and the conventional phosphate coating does not provide a surface effective to prevent galling. That is, the conventional chemical forming process does not prevent the occurrence of galling in the oil well joint made of a high alloy steel such as one containing 10% or more by weight of Cr.

Thus, the object of this invention is to provide an oil well joint and a process for manufacturing same, which ensures the prevention of the occurrence of "galling" in the oil well joint made of a high-Cr alloy steel by means of surface treatment while retaining desirable superior sealing properties despite the fact that surface treatment of such a high-Cr alloy steel is in general difficult due to the presence of a tenacious passive film on the surface thereof.

The inventors of this invention carried out a series of experiments in order to find out how to prevent the occurrence of "galling" in the oil well joint made of a high-Cr alloy steel. The inventors found that this can be achieved by the provision of a primary activating layer on the surface of the steel and an additional electrodeposited layer covering the aforesaid primary activating layer.

Figure 1:
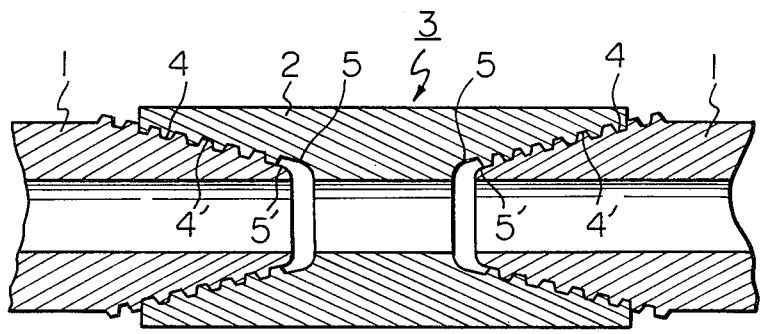
FIG. 1 is a diagrammatical sectional view showing an oil well joint of this invention in the course of coupling two pieces of oil well casing or tubing.

In summary, this invention resides in an oil well joint for use in connecting oil well casing and/or tubing with improved metal-to-metal sealing properties, the joint being made of an alloy steel containing 10% or more by weight of Cr and being comprised of a metal sealing portion and a threaded portion, characterized in that at least part of the surface of said metal sealing portion has been provided with an activating layer of a metal or an alloy selected from the group consisting of iron, nickel, zinc, cobalt, copper, manganese, chromium and alloys thereof, and an electrodeposited layer of a metal or an alloy selected from the group consisting of iron, copper, zinc, chromium, nickel and alloys thereof, said activating layer being firmly adhered to the surface of said metal sealing portion, the amount of said electrodeposited layer provided on said activating layer being 2 $g/m^2$ or more, preferably 20 $g/m^2$ or more.

In a preferred embodiment of this invention, said activating layer is formed by subjecting said surface to anodic electrolysis in an acidic aqueous solution containing halide ions and then immediately thereafter to cathodic electrolysis.

This invention also resides in a method of producing a joint for use in connecting oil well casing and/or tubing with improved metal-to-metal sealing properties, which comprises preparing a joint made of an alloy steel containing 10% or more by weight of Cr, said joint comprising a threaded portion and a metal sealing portion, subjecting at least part of said metal sealing portion to anodic electrolysis in an acidic aqueous solution containing halide ions, then immediately thereafter switching the anodic electrolysis to cathodic electrolysis in the same aqueous solution to provide an activating layer of a metal or an alloy selected from the group consisting of iron, nickel, zinc, cobalt, copper, manganese, chromium and alloys thereof, and carrying out electrodeposition of a metal or an alloy selected from the group consisting of iron, copper, zinc, chromium, nickel and alloys thereof.

The surface treatment of this invention may be applied to at least part of the surface of the metal sealing portion as well as at least part of the surface of the threaded portion of the oil well joint.

The term "joint" herein used includes not only a tubular fitting which can connect the casing and/or tubing, but also the end portions of the casing and/or tubing themselves as long as they have a metal sealing portion and a threaded portion.

Examples of the high alloy steel used in this invention, which contains 10% or more by weight of Cr as well as nickel and other alloying elements include ferritic, martensitic, austenitic, or ferrite-austenitic dual phase steels, as well as any other materials which are suitable for manufacturing the oil well casing and/or tubing. A preferred steel is a high alloy steel the alloy composition of which is $Cr \geq 10\%$ and $10\% \leq Cr+Ni+Mo \leq 95\%$.

As hereinbefore mentioned, since a high alloy steel containing 10% or more by weight of Cr, particularly one the composition of which is $10\% \leq Ni+Cr+Mo \leq 95\%$ does not have any affinity for an electrodeposited layer, the electrodeposited layer, if it is formed, would not adhere firmly to the steel surface without additional treatment. Thus, according to a preferred embodiment of this invention, the alloy steel surface is subjected to an activating treatment to prepare an activated surface, which comprises applying anodic electrolysis to the surface in an acidic aqueous solution containing halide ions, preferably chloride ions, then immediately thereafter applying cathodic electrolysis to the surface to electroplate a metal or an alloy selected from the group consisting of Fe, Ni, Zn, Co, Cu, Mn, Cr and alloys thereof.

Namely, as a first stage of the preliminary treatment of the alloy steel surface, an activating layer is prepared preferably by carrying out anodic electrolysis of the alloy steel surface in an acidic aqueous solution containing halide ions, and then switching from the anodic electrolysis to cathodic electrolysis while maintaining the alloy steel surface in said aqueous solution. Thus, a primary plating which adheres firmly to the steel surface can be obtained. In principle, the preliminary treatment of this invention is not limited to this specific one, as long as it is possible to provide an activating layer which firmly adheres to the steel surface.

In a preferred embodiment, as hereinafter described, the above-mentioned metals are added to the acidic solution in the form of a halide, especially in the form of a chloride or a fluoride. Metallic cations are precipitated onto the alloy steel surface to form an activating layer.

In a further preferred embodiment, the anodic electrolysis is carried out at a current density of $1 A/dm^2$ or higher for 10 seconds or longer, usually for 2–5 minutes and the cathodic electrolysis is carried out at a current density of $1 A/dm^2$ or higher for 10 seconds or longer, usually for 2–6 minutes.

The phrase "acidic aqueous solution containing halide ions" means an aqueous solution of an acidic pH, which contains halide ions, particularly chloride ions ($Cl^-$) as well as metallic cations to be electrodeposited as an activating layer. Examples of the halide are $NiCl_2$, $CuCl_2$, $FeCl_2$, $CoCl_2$, $ZnCl_2$, $MnCl_2$, $CrCl_3$ etc.. These may be either in the form of a hydrate or an anhydride. Preferably, the acidic aqueous solution contianing halide ions is an acidic aqueous solution containing chloride ions, such as ferrous chloride, zinc chloride and cuprous chloride.

When a chloride is used as a halide, the amount of chloride ions added to the aqueous solution is 1 g/l or more calculated as chloride. In case the alloy steel contains 20% or more of Cr, the chloride ions are preferably added in an amount of 30 g/l or more calculated as chloride.

Furthermore, if desired, an additive such as LiCl, NaCl, KCl, $MgCl_2$ and $CaCl_2$ may be added to the acidic aqueous solution to accelerate the activation of the steel surface. The pH may be adjusted by the addition of an acid, such as HCl and $H_2SO_4$.

The thus prepared layer firmly adheres to the steel surface to provide a primary activating layer as a base for the succeeding electrodeposition.

A metal or an alloy selected from the group consisting of Fe, Cu, Zn, Cr, Ni and alloys thereof is then electrodeposited onto the activating layer. The electrodeposition at this stage of this invention may be the conventional one, which is not limited at all as long as it can provide a sufficient amount of electrodeposition to resist the metal-to-metal contacting pressure without resulting in galling. The amount of electrodeposition is $2 g/m^2$ or more, preferably $20 g/m^2$ or more.

Therefore, it is advantageous to this invention that, as mentioned above, the conventional electrodeposition may be applied to the activated surface to provide an electrodeposited layer firmly adhering to the high alloy steel surface.

When the metal of the primary layer is the same as that of the electrodeposited layer, electroplating can be continued using the same plating bath to provide a single layer of plating. However, since a halogen (chlorine) gas and other toxic gases are usually released from the halide-containing bath during operation, it is preferable to employ a different electroplating bath having an acidic pH. In addition, with the halide-containing bath the electroplating efficiency is rather low, resulting in increase in processing cost. Therefore, it is preferable to carry out the final electrodeposition using the conventional acidic bath in a separate electroplating cell.

According to this invention, plating or electrodeposition may be applied to only the surface of the metal sealing portion of the joint. However, when a higher level of sealing is required, it is desirable to also apply the plating to at least part of the surface of the threaded portion so that the occurrence of galling on the metal surface can more effectively be prevented.

FIG. 1 is a diagrammatical sectional view showing an oil well casing (or tubing) 1 being joined with a coupling joint 2 to provide oil well joint 3 of this invention. The inner annular ends of coupling joint 2 comprise metal sealing portions 5,5 and threaded portions 4,4 provided in the surface toward the open ends. The inner annular surface of the coupling joint 2 tapers inwardly, so at the innermost point—that is, at the middle of the joint—the diameter is the smallest. The inner surface of the coupling joint guides the inserted ends of the casing (or tubing) to be connected until the metal sealing portion 5 and the forward end of the casing contact and establish an airtight seal. Sometimes there is provided in the ending area—that is, the innermost area—of the metal sealing portion a projection having a given radius (omitted from the drawings) in order to further improve the tightness of the joint. The opposing end of tube 1 also constitutes a part of the oil well joint of this invention and comprises, just like the above mentioned coupling joint 2, a threaded portion 4' and a metal sealing portion 5' for each of the tubes 1 to be connected.

Figure 2:
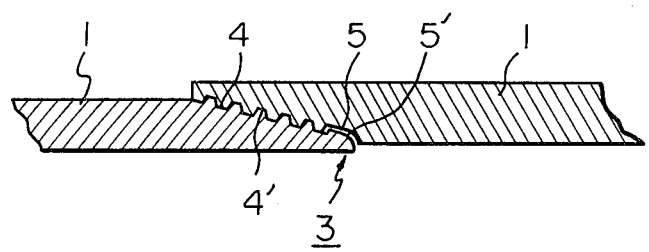
FIG. 2 is a diagrammatical sectional view showing another type of oil well joint of this invention.

FIG. 2 shows another example of the oil well joint of this invention. The ends of the tubes to be connected constitute the oil well joint 3 of this invention. Each of the opposing ends of the tubes has a threaded portion 4,4' and a metal sealing portion 5,5', respectively. Therefore, there is no need to use such a coupling joint 2 as shown in FIG. 1. In FIG. 2 the same members as in FIG. 1 are identified by the same numerical references.

EXAMPLES

A steel tube was manufactured from the alloy steel material the steel composition of which is shown in Table 1 below. The resulting tube was then threaded as shown in FIG. 1 to provide a steel tube and a coupling joint each having an inner diameter of 120 mm.

The metal sealing portion and the threaded portion of the thus prepared steel tube and coupling joint were, after degreasing, subjected to surface activating treatment in accordance with this invention. Electrodeposition was then applied to the thus obtained activated steel surface at a temperature of 50° C. at a current density of 10 A/dm$^2$ for a given period of time. The degreasing was carried out by dipping the metal surface in a commercially available alkaline degreasing solution and then washing the degreased surface with water.

Figure 3:
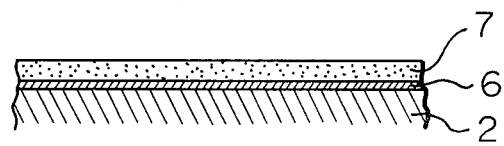
FIG. 3 diagrammatically shows a surface structure in section comprising an activating layer and an electrodeposited layer.

The cross-section of the thus obtained metal surface is diagrammatically shown in FIG. 3, from which it is clear that two different layers are deposited on the steel surface of the metal sealing portion and the threaded portion of the coupling joint (and the tubes) 2—a first or primary activating layer 6 and on top of this a second electrodeposited layer 7.

The resulting steel tube and coupling joint each having a threaded portion and a metal sealing portion which have been treated, i.e. provided with an activating layer and an electrodeposited layer in accordance with this invention were connected and disconnected twenty times according to the API specification. Then the threaded portion and the metal sealing portion were visually examined for "galling". The airtightness of the joint was also tested in accordance with the API specification (RP-37) by applying a pressure at a level of 90% of the inner surface yielding pressure of the steel tube. The leakage of the air was checked.

The test results as well as the primary plating conditions and the finishing electrodepositing conditions are summarized in Table 2 below. The same treatment and testing were applied to both Steels A and B. Substantially the same results were obtained for both steels, so the test results in Table 2 are shown without saying which steel was used.

The test results in Table 2 below shows that for both Steels A and B the joints of this invention are superior to the comparative ones with respect to resistance to galling and in sealing properties.

In these experiments, the activating layer and the electrodeposited layer were provided on both the metal sealing portion and the threaded portion. However, the intended effect will be obtained if these layers are applied only on the metal sealing portion.

TABLE 1

| Steel | C | Si | Mn | P | S | Cu | Ni | Cr | Mo |
|---|---|---|---|---|---|---|---|---|---|
| A | 0.20 | 0.50 | 0.60 | 0.02 | 0.01 | 0.05 | 0.1 | 12.5 | 0.03 |
| B | 0.02 | 0.43 | 0.83 | 0.01 | 0.01 | 0.40 | 6.12 | 24.8 | 3.1 |

TABLE 2

| Example No. | Primary plating | | | | | Finishing plating Electrodeposited layer | | Test Results | |
|---|---|---|---|---|---|---|---|---|---|
| | Plating bath | | Electrolysis conditions | | | | | | |
| | Concentration (g/l) | Agent | Polarity of Steel surface | Current density (A/dm$^2$) | Processing time (min) | Deposited metal | Deposition (g/m$^2$) | Galling | Leakage |
| This Invention | | | | | | | | | |
| 1 | 100 | FeCl$_2$ | Anodic (+) | 4 | 3 | Cu | 5 | None | None |
| | 50 | HCl | Cathodic(−) | 10 | 6 | | | | |
| 2 | 200 | NiCl$_2$ | Anodic (+) | 4 | 2 | Cu | 20 | None | None |
| | 100 | HCl | Cathodic(−) | 10 | 5 | | | | |
| 3 | 200 | ZnCl$_2$ | Anodic (+) | 4 | 1 | Zn | 80 | None | None |
| | 80 | NaCl | Cathodic(−) | 20 | 5 | | | | |
| | 100 | HCl | | | | | | | |
| 4 | 200 | CoCl$_2$ | Anodic (+) | 4 | 3 | Cr | 150 | None | None |
| | 80 | HCl | Cathodic(−) | 10 | 5 | | | | |
| 5 | 200 | CuCl$_2$ | Anodic (+) | 7 | 3 | Ni | 150 | None | None |
| | 50 | HCl | Cathodic(−) | 10 | 3 | | | | |
| | 50 | KCl | | | | | | | |
| 6 | 200 | MnCl$_2$ | Anodic (+) | 7 | 2 | Fe | 100 | None | None |
| | 100 | HCl | Cathodic(−) | 20 | 6 | | | | |
| 7 | 150 | CrCl$_3$ | Anodic (+) | 7 | 3 | Ni | 80 | None | None |
| | 100 | HCl | Cathodic(−) | 10 | 3 | | | | |
| 8 | 200 | NiCl$_2$ | Anodic (+) | 4 | 3 | Cu | 20 | None | None |
| | 100 | H$_2$SO$_4$ | Cathodic(−) | 10 | 6 | | | | |
| 9 | 200 | NiSO$_4$ | Anodic (+) | 4 | 3 | Cu | 20 | None | None |
| | 100 | HCl | Cathodic(−) | 10 | 6 | | | | |
| Comparative | | | | | | | | | |
| 10 | 200 | NiCl$_2$ | Cathodic(−) | 10 | 5 | Cu | 20 | Yes | None |
| | 100 | HCl | | | | | | | |
| 11 | 200 | NiSO$_4$ | Anodic (+) | 4 | 2 | Cu | 20 | Yes | None |
| | 100 | H$_2$SO$_4$ | Cathodic(−) | 10 | 5 | | | | |
| 12 | 200 | ZnCl$_2$ | Anodic (+) | 4 | 2 | Cu | 1 | Yes | Yes |
| | 80 | NaCl | | | | | | | |
| | 100 | HCl | Cathodic(−) | 10 | 5 | | | | |

What is claimed is:

1. A joint with improved metal-to-metal sealing properties for use in connecting oil well casing and/or tubing, which comprises a metal sealing portion and a threaded portion and which is made of an alloy steel containing 10% or more by weight of chromium, characterized in that at least part of the surface of said metal sealing portion has been provided with an activating layer of a metal or an alloy selected from the group consisting of iron, nickel, zinc, cobalt, copper, manganese, chromium and alloys thereof, and an electrodeposited layer of a metal or an alloy selected from the group consisting of iron, copper, zinc, chromium, nickel and alloys thereof, said activating layer being firmly adhered to the steel surface by subjecting said surface to anodic electrolysis in an acidic aqueous solution containing halide ions and then immediately thereafter to cathodic electrolysis, the amount of said electrodeposited layer provided on said activating layer being 2 g/m$^2$ or more.

2. A joint for use in connecting oil well casing and/or tubing, as defined in claim 1, in which said activating layer and said electrodeposited layer are provided on at least part of said surface of said metal sealing portion as well as on at least part of the surface of said threaded portion of said joint.

3. A joint for use in connecting oil well casing and/or tubing, as defined in claim 1 or 2, in which said alloy steel contains not less than 20% by weight of Cr.

4. A joint for use in connecting oil well casing and/or tubing, as defined in claim 1 or 2, in which said halide ions are chloride ions.

5. A joint for used in connecting oil well casing and/or tubing, as defined in claim 1 or 2, in which the amount of said electrodeposited layer is 20 g/m$^2$ or more.

6. A method of producing a joint with improved metal-to-metal sealing properties for use in connecting oil well casing and/or tubing, which comprises preparing a joint made of an alloy steel containing 10% or more by weight of chromium, said joint comprising a threaded portion and a metal sealing portion, subjecting at least part of said metal sealing portion to anodic electrolysis in an acidic aqueous solution containing halide ions, then immediately thereafter switching the anodic electrolysis to cathodic electrolysis in the same aqueous solution to provide an activating layer of a metal or an alloy selected from the group consisting of iron, nickel, zinc, cobalt, copper, manganese, chromium and alloys thereof, and carrying out electrodeposition of a metal or an alloy selected from the group consisting of iron, copper, zinc, chromium, nickel and alloys thereof.

7. A method as defined in claim 6, in which said halide ions are chloride ions in an amount of 1 g/l or more calculated as chloride.

8. A method as defined in claim 7, in which the alloy steel contains 20% or more of Cr and the chloride ions are in an amount of 30 g/l or more calculated as chloride.

9. A method as defined in claim 6, in which said anodic electrolysis is carried out at a current density of 1 A/dm$^2$ or higher for a period of 10 seconds or longer, and said cathodic electrolysis is carried out at a current density of 1 A/dm$^2$ or higher for a period of 10 seconds or longer.

10. A method as defined in claim 9, in which said anodic electrolysis is carried out for a period of 2–5 minutes and said cathodic electrolysis is carried out for a period of 2–6 minutes.

11. A method as defined in claim 6, in which the amount of the electrodeposited layer placed over the activating layer is 2 g/m$^2$ or more.

12. A method as defined in claim 11, in which the amount of the electrodeposited layer is 20 g/m$^2$ or more.

13. A method as defined in any one of claims 6–12, in which the electrodeposition onto said activating layer is carried out using a separate electroplating acidic bath.

14. A process for improving metal-to-metal sealing properties of a joint for use in connecting casing and/or tubing, said joint being prepared from an alloy steel containing 10% or more by weight of chromium and said joint comprising a metal sealing portion and a threaded portion, which comprises subjecting at least part of said metal sealing portion to anodic electrolysis in an acidic aqueous solution containing halide ions, then immediately thereafter switching the anodic electrolysis to cathodic electrolysis in the same aqueous solution to provide an activating layer of a metal or an alloy selected from the group consisting of iron, nickel, zinc, cobalt, copper, manganese, chromium and alloys thereof, followed by electrodeposition of a metal or an alloy selected from the group consisting of iron, copper, zinc, chromium, nickel and alloys thereof.

15. A process as defined in claim 14, in which at least part of the surface of said threaded portion of said joint is subjected to the same treatment as said at least part of said metal sealing portion.

16. A process as defined in claim 14 in which said alloy steel contains not less than 20% by weight of Cr.

17. A process as defined in claim 14 in which said halide ions are chloride ions in an amount of 1 g/l or more calculated as chloride.

18. A process as defined in claim 14, in which said anodic electrolysis is carried out at a current density of 1 A/dm$^2$ or higher for a period of 10 seconds or longer, and said cathodic electrolysis is carried out at a current density of 1 A/dm$^2$ or higher for a period of 10 seconds or longer.

19. A process as defined in claim 18, in which said anodic electrolysis is carried out for a period of 2.5 minutes and said cathodic electrolysis is carried out for a period of 2–6 minutes.

20. A process as defined in claim 14, in which the amount of the electrodeposited layer placed over the activating layer is 2 g/m$^2$ or more.

21. A process as defined in claim 20, in which the amount of the electrodeposited layer is 20 g/m$^2$ or more.

22. A process as defined in claim 14, in which the electrodeposition onto said activating layer is carried out using a separate electroplating acidic bath.

* * * * *